Sept. 26, 1939.  G. NEMNICH  2,174,194
FILM EDITING AND VIEWING AND GUIDING DEVICE
Filed Dec. 27, 1937  2 Sheets-Sheet 1
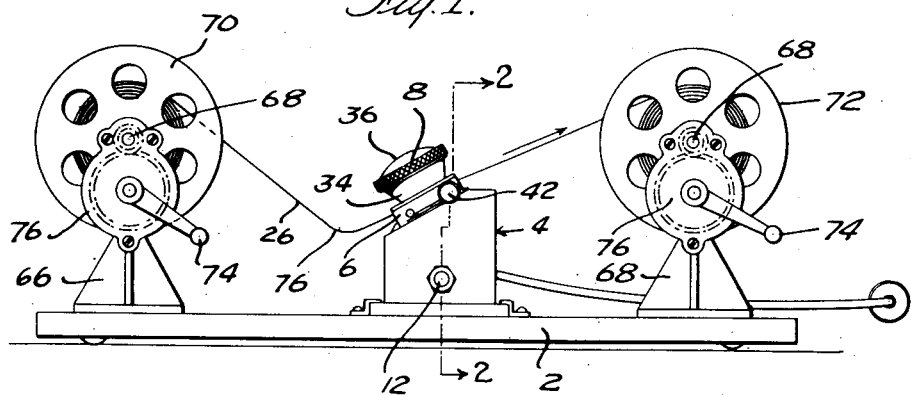
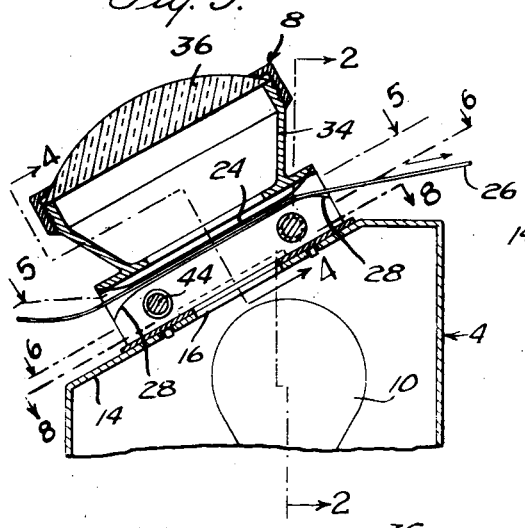
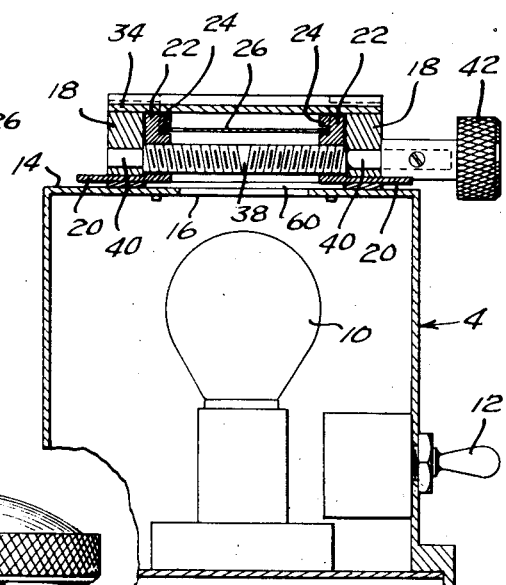
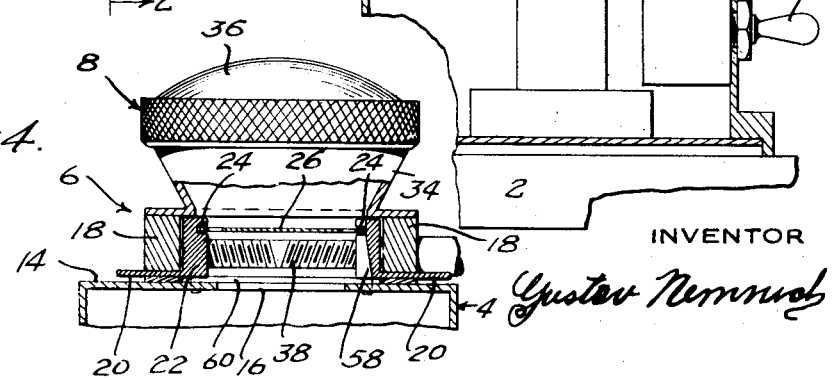
INVENTOR
Gustav Nemnich

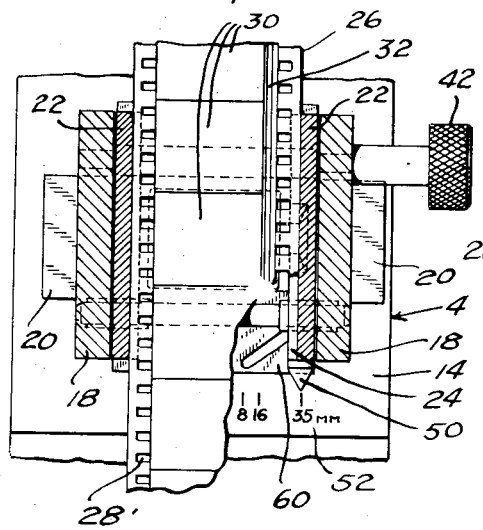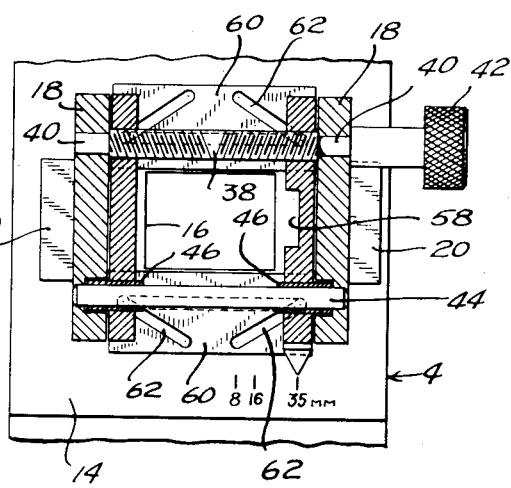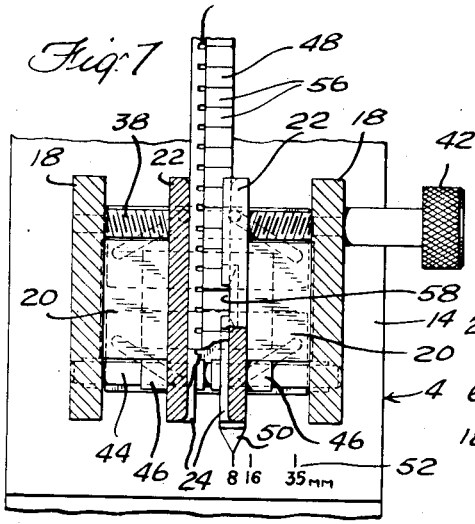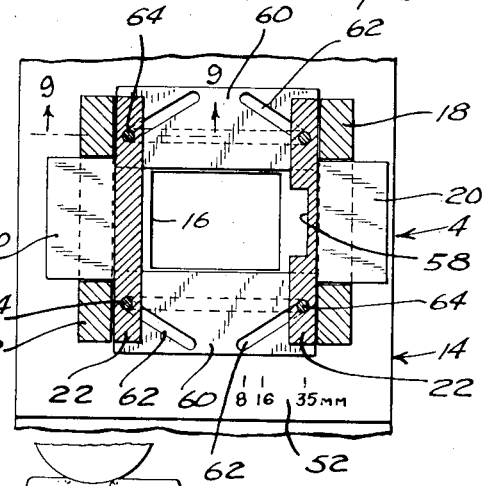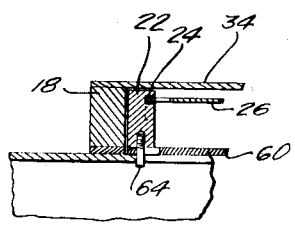

Patented Sept. 26, 1939

2,174,194

UNITED STATES PATENT OFFICE 2,174,194

FILM EDITING AND VIEWING AND GUIDING DEVICE

Gustav Nemnich, New York, N. Y., assignor to Kin-o-Lux, Inc., New York, N. Y., a corporation of New York Application December 27, 1937, Serial No. 181,793

2 Claims. (Cl. 88—17)

This invention relates to film editing and viewing machines and like apparatuses.

The motion picture film industry has expanded considerably in the past years so that various sizes of motion picture films have appeared on the market and in the past film editing machines have been made for each size of film strip, therefore requiring film studios of all kinds to purchase editing machines for each size of film used.

Therefore the main object of my invention is the production of a universal editing machine capable of viewing film strips of different sizes, and a further object of the invention is to render the universal machine capable of viewing the selected film size by a simple manipulation.

Another object is the production of such a machine which is simple in construction and operation, in order that the machine will find a ready sale not only in the industrial studios but in the amateur motion picture film market.

Due to the universality of my machine, the simplicity of operation and construction, makes for quantity production thus bringing down the sales price of the machine to both the industrial studios and the rapidly expanding amateur motion picture film market.

It will be noted that the principle of operation and construction of the invention will render the machine capable of handling film rolls or strips of the still cameras.

It will be further noted that part of the construction is capable of being used in place of the present fixed size film gate of motion picture cameras and projection machines, thereby making such machines capable of handling various film sizes by minor manipulations.

Other objects of the invention not especially mentioned may be readily ascertained and understood from the following description in connection with the accompanying drawings.

Referring to the drawings:

Fig. 1 is side view of the invention and associated parts.

Fig. 2 is a cross section taken on line 2—2 of Fig. 1.

Fig. 3 is a fragmentary sectional view of the device looking in the same direction as Fig. 1.

Fig. 4 is a fragmentary sectional view taken on line 4—4 of Fig. 3.

Fig. 5 is a sectional view taken on line 5—5 of Fig. 3 showing a film strip in position.

Fig. 6 is a sectional view taken on line 6—6 of Fig. 3.

Fig. 7 is a sectional view similar to Fig. 5 but showing parts in position for guiding a narrower film strip.

Fig. 8 is a section taken on line 8—8 of Fig. 3, showing clearly the mask plates.

Fig. 9 is a section taken on line 9—9 of Fig. 8 showing the pin and slot connection between the mask plates.

Fig. 10 is a diagrammatic illustration of the film guide showing the use of same in a motion picture camera or projector.

Referring to Figures 1 and 2, a base 2 serves to support a film editing device comprising a housing 4, film strip guiding unit 6 and film picture magnifying unit or housing 8. The housing 4 encloses an electric light bulb 10 and a switch 12 therefore, with, of course, the usual current source and wires some of which are not shown. The top 14 of said housing 4, is inclined as shown in Fig. 1, so that it is easier for the editor to view the film by bending over from the left of base 2. The top 14 serves as a support for film guiding unit 6 and has an aperture 16 over which the films are guided. The unit 6 shown in all figures, comprises side walls 18 mounted upon support 14, in which are slidably guided mask plates 20 having enlarged inner guide portions 22. These portions 22 are grooved at 24 to guide a film strip 26 and the grooves are flared at 28, Figure 3, in order to more smoothly guide the film into and out of the film guiding unit 6, and also to facilitate film end insertion.

As will be noted from Figures 4 and 5 the grooves 24 are of a depth sufficient to engage only the portion of the film strip 26 beyond perforations 28' thus leaving the film pictures 30 and sound track 32 exposed to the light radiating from aperture 16. The magnifying unit or housing 8, Figures 1, 3, and 4, comprises a conical sleeve 34 secured to side walls 18 and a magnifying lens 36 which is, of course, focused upon the film strip 26, overlying the aperture 16. The film editor will therefore be able to view the film pictures and the film strip as it is moved directly by hand or indirectly by reels cranked by hand as will be described hereinafter.

The aperture 16 is of a size sufficient to frame one picture 30 at a time of the 35 millimeter film 26, which is shown in position in Figures 2, 4, and 5. The editor will therefore view only one picture at a time and mark it accordingly after it leaves the guiding unit 6. The glass envelope of the bulb 10 is ground, of course, in order to properly diffuse the light rays. As the main object of the device is its ability to accommodate film strips of different millimeter widths, this construction will now be described.

The enlarged portion 22, Figures 2, 3, 6, and 7, are elongated sufficiently to bring their ends beyond the scope of the aperture 16, at which point one of each of their ends is threaded upon a left and right hand screw spindle 38 which in turn is rotatably mounted in side walls 18 and held against longitudinal displacement by shouldered bearings 40. One end of said spindle 38 is extended beyond its wall 18 and terminates in a finger knob 42 by means of which the portions 22 and their integral mask plates 20 may be moved to and from each other by turning the knob 42 one way or the other. To prevent the mask plates 20 from binding in their slots in walls 18 a guide rod 44, secured in walls 18 is embraced by guide sleeves 46 rigidly secured in the other ends of portions 22, as shown in Figures 3, 6, and 7.

Fig. 7 illustrates the position of mask plates 20 and their portions 22 for editing and guiding the narrowest of film strips 48, which is 8 millimeters wide.

In order that the manual positioning of the film guiding portions 22 may be accomplished without relying upon skill and sense of touch a pointer 50, Figures 5, 6, and 7, upon one of the portions 22 cooperates with a scale 52 upon top 14 of housing 4. The scale in the present instance carries calibrations for film sizes 8, 16 and 35 mm., but it is understood that the machine and the scale can be varied to suit new sizes as they appear on the market without departing from the scope of the invention. It is characteristic of screw threading that the parts moved by the screw spindle 38 will remain in the position to which they have been moved. This is especially true of fine threads having a single lead. Other well known means may be used to positively lock the spindle 38 in position.

Film strips of 8 millimeter width carry perforations 54 near one edge only thus bringing the individual pictures 56 up to the other edge. Therefore, this edge riding in its portion 22 will have a portion of each picture obscured by an amount equal to the depth of the groove 24 were it not for the fact that a beveled cut out 58, Figures 4, 5, 6, 7, and 8, of groove depth and of picture height permits the exposure of the entire picture to the light from aperture 16. The proportion of the aperture 16 and associated portions 22 will permit the viewing of only one picture of the large size film strip 26 and as the bringing together of portions 22 and mask plates 20 will properly reduce the light aperture in one dimension for the smaller sizes of film strips a pair of additional mask plates 60, Figures 3, 6, 7, 8, and 9, are provided to properly limit the light aperture in the other dimension.

Referring to the figures above mentioned these plates 60 are guided between side walls 18, and carry cam slots 62 into which project pins 64 carried by the ends of guide portions 22. The slots 62 are cut so that their extended imaginary construction lines would form a diamond, therefore a moving together of the portions 22 will cause a like moving together of the mask plates 60 and vice versa.

The standard proportion of a film picture is 4:3, or 4 parts width to 3 parts height, therefore to accurately mask all films pictures of the smaller film sizes, the inclination of the slots 62 is such as to bring about a 4:3 light aperture. However, should the proportion of 4:3 become slightly varied in one way or the other for one or more of the film sizes and not other film sizes, properly designed curved slots would accommodate such variation.

Although the above description covers the application of my invention to film editing machines it is understood that the variable film guide unit 6 may be used as a unit to take the place of the ordinary film gate in motion picture cameras and projection machines thus rendering these machines capable of running different width films as well. This is diagrammatically illustrated in Fig. 10.

Referring now to the parts associated with the film editing device, these comprise standards 66 secured fore and aft of the editing device 4. Each standard supports a spindle 68, the fore spindle of which detachably carries a take off reel 70 and the aft spindle of which carries a take on reel 72. The film 26 enters the film guide 6 at its lowest point and leaves at its highest and extends to reel 72.

Each spindle 68 is driven by hand crank 74 through gear box 76 which has a ratio of approximately four revolutions of the reel to one of the crank. The film may be fed through the film guide 6 by means of the crank of the reel 72, picture by picture or the film may be pulled through by hand, picture by picture, and the crank 74 used only to take up the slack created aft of the editing. When the film is being advanced by operating crank 74 of reel 72 the index finger of the left hand of the editor bears against the film 26 at the bend 76, Fig. 1, in order to provide a proper brake and retard the film as it moves through guiding part 6, thereby enabling the operator to control the film speed. A motor drive may be provided in place of the hand drive when desired.

The film speed may also be controlled by bringing the portions 22 together until the bottom of the grooves 24 bear against the edge of the film. The amount of pressure against the film edge can be controlled to a nicety by proper manipulation of the knob 24 thereby bringing about the desired film speed. Manual braking will be then unnecessary.

The film may be retracted by pulling down at the bend 76 just in front of the editing device.

Although the description has been confined to motion picture films of many sizes it will be noted that the invention is adaptable in principle and construction to handle roll films of various widths and requiring only a change in the proportion of parts.

It may be desired in some cases to view more than one film picture at a time in which case the proportion of some parts would be changed. The aperture 16 would be enlarged, the walls 18 and portions 22 and masks 20, elongated to the desired range, and the sleeve 34 and lens 36 enlarged. The additional mask plates 60 would be, of course, omitted.

Having described my invention and its method of operation, what I claim as new and desire to secure by Letters Patent is:

1. In a film guiding device of the character described having a support, a pair of mask plates movably carried on said support and having guide portions adapted to guide a film strip, a second pair of movable mask plates carried by said support and forming a variable aperture with said first mentioned plates, pins carried by said first mentioned mask plates, cam slots engaged by said pins carried by said second mentioned pair of mask plates so that a moving together or apart of one of said pairs of mask plates causes a like movement on the part of said other pair of mask plates, and means for changing at will the position of said first mentioned mask plates in order to accommodate different width film strips in said guide portions.

2. In a film strip guiding device of the character described having a support, a pair of mask plates movably carried on said support and having guide portions adapted to guide a film strip, a rotatable, hand-operated feed screw positively threaded into one end of said mask plates so that said plates may be moved to and from each other in order to accommodate different width film strips, another pair of mask plates movably mounted on said support and forming a variable aperture with said first mentioned mask plates, pins carried by said first mentioned mask plates, cam slots formed in said second mentioned mask plates and engaged by said pins in order that a moving together or apart of said first mentioned mask plates causes a like movement on the part of said second mentioned mask plates thereby to vary the aperture, a guide rod fixedly carried by said support for guiding the other end of said first mentioned mask plates, and relatively movable pointer and scale elements carried by one of said first mentioned mask plates and the said support for indicating the position of said mask plates.

GUSTAV NEMNICH.